United States Patent [19]

Casamitjana

[11] 4,312,751
[45] Jan. 26, 1982

[54] CENTRIFUGAL WATER SEPARATOR

[76] Inventor: Jordi Casamitjana, 3a. Cda. de Camino de Minas 139, Mexico 18, D. F., Mexico

[21] Appl. No.: 86,381

[22] Filed: Oct. 19, 1979

[51] Int. Cl.³ .......................................... B01D 21/26
[52] U.S. Cl. ................................. 210/94; 210/512.1
[58] Field of Search .............. 210/94, 416.4, 787–789, 210/136, 304, 512.1

[56] References Cited

U.S. PATENT DOCUMENTS

| | | | |
|---|---|---|---|
| 1,477,885 | 12/1923 | Lehmann | 210/94 |
| 1,981,397 | 11/1934 | Tabozzi | 210/94 |
| 3,122,501 | 2/1964 | Hultgren | 210/94 |
| 3,542,194 | 11/1970 | Gough | 210/304 X |
| 3,868,321 | 2/1975 | Gough | 210/512.1 X |
| 4,199,443 | 4/1980 | Tauber | 210/304 X |

*Primary Examiner*—Thomas G. Wyse
*Attorney, Agent, or Firm*—Ladas & Parry

[57] ABSTRACT

This invention relates to a self-contained device which separates water and solid contaminants from fuels used by internal combustion engines.

8 Claims, 8 Drawing Figures

CENTRIFUGAL WATER SEPARATOR

BACKGROUND OF THE INVENTION

At present, to eliminate solid contaminants from the fuel, several types of filtering paper elements are employed. These elements will trap solid contaminants but, are not capable of separating or eliminating water contained in the fuel.

It is known to employ separate water and solid contaminants filters and separators, manufactured as self-contained units, for removal of water and solid contaminants from diesel fuel. Use of such units involves inconvenience and loss of time, in that they have to be removed from their mounting position, and fuel lines and connections, clamps and bolts have to be removed in order to change filter elements, etc., for cleaning and maintenance purposes. Also they have to be assembled and installed back to their original location. Another inconvenience is that these units require replacement fuel filter elements specially made by their manufacturers that in some instances are not easy to obtain.

Now then, the apparatus of this invention avoids these disadvantages, is adaptable to any type of diesel or gasoline engines, in any type of applications: automotive, marine, industrial, construction, power plants, etc., being an important benefit that the device extends the life of fuel pumps, injectors and carburators and in particular the original fuel filter elements, by separating solids and water contaminants from the fuel.

Another advantage of the invention is that there is no need to discard the original filtering equipment, previously designed and recommended by the engine manufacturers.

Thus, it is an object of this invention to provide a compact and self-contained water and solid contaminants separator which is easy to install and remove from its mounting position by simply screwing or unscrewing it from its mounting head, which is and forms part of the apparatus.

In this way, it is possible to remove a separator clogged by dirt with a simple hand twist and install a new one, screwing it back to its mounting head, without the inconvenience of removing hoses, connections, bolts, clamps, etc.

It is a further object of this invention to provide in this manner, a "throw-away" type, water and solid contaminants separator.

PRINCIPAL ADVANTAGES OF THE INVENTION

According to the description of the apparatus, the following principal features are claimed to be an object of invention.

Operation improvements of a centrifugal separator of water and solid contaminants, found in the fuels used by internal combustion engines.

1. A self-contained, compact unit easy to remove, install or replace.

2. No connections to install or fuel lines to remove, nor clamps or bolts to withdraw to service, clean or exchange.

3. Transparent parts in the centrifugal assembly to observe separation of contaminants and to visually appreciate when to replace, clean or exchange a unit when clogged by dirt, etc.

4. Perfect sealing assured by two "O" rings when the two sections of the apparatus are coupled together.

5. Handy to install, no tools necessary. The separator unit is easy to couple with the second unit, being the mounting head.

6. It is a unit that proves, in this manner, to be a "throw away type", water and solid contaminants separator.

7. There is no need to discard the original filter equipment calculated and recommended by the engine manufactures.

SUMMARY OF THE INVENTION

In brief, this water and solid contaminants separator is a self-contained, compact apparatus, manufactured in two sections. The first section, comprises a concave sealed plastic chamber, containing the separation, agglutination and contaminants drainage assemblies. The second section, contains the inlet and outlet passages and fuel hose connections. By means of a drilled threaded bushing integrated in the second section, this and the first section are assembled together to form the claimed separation apparatus.

BRIEF DESCRIPTION OF OPERATION

Figure 1:
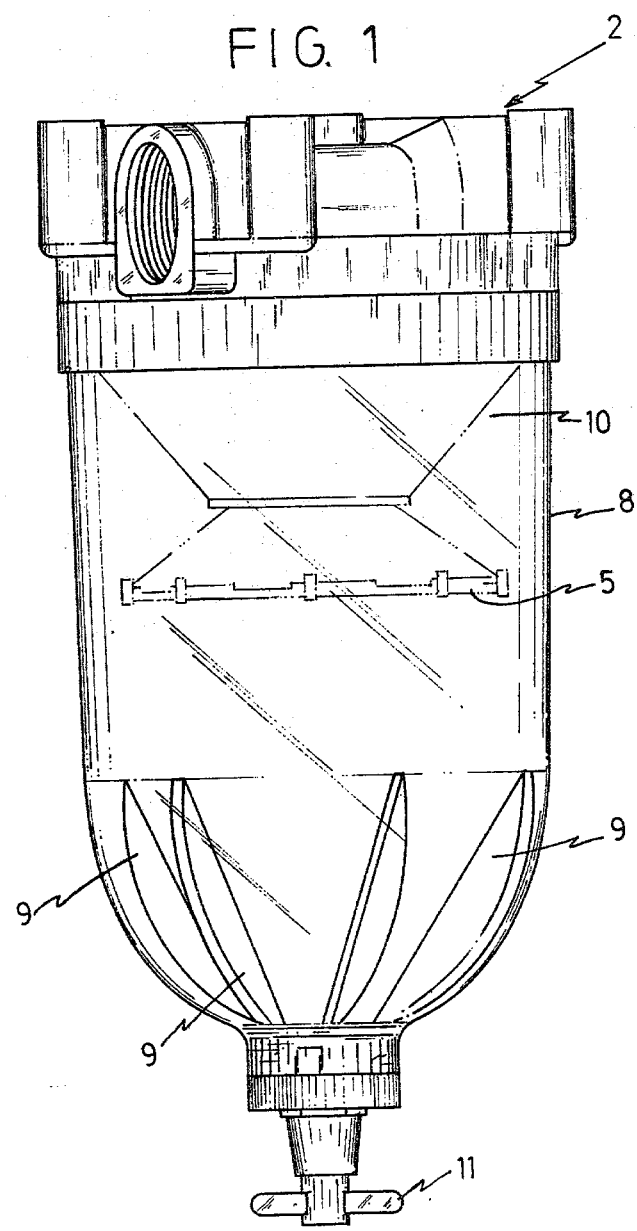
FIG. 1 is a lateral view of the centrifugal water separator.
Figure 2:
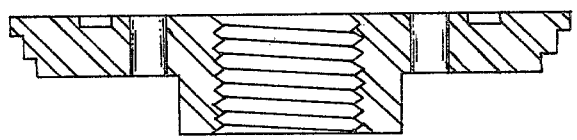
FIG. 2 is a sectional view of the upper section sealing the plastic bowl of the water separator.
Figure 3:
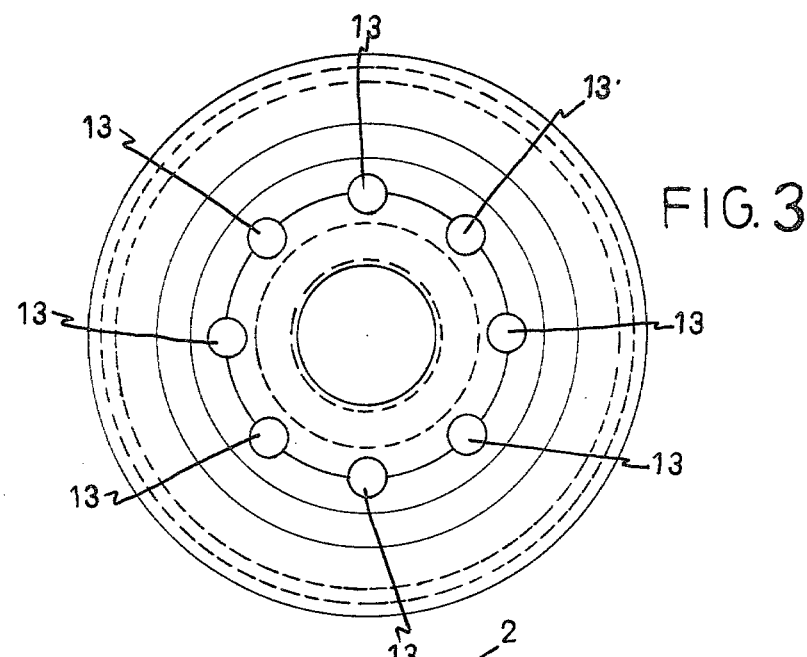
FIG. 3 is a top view of the upper portion of the plastic bowl.
Figure 5:
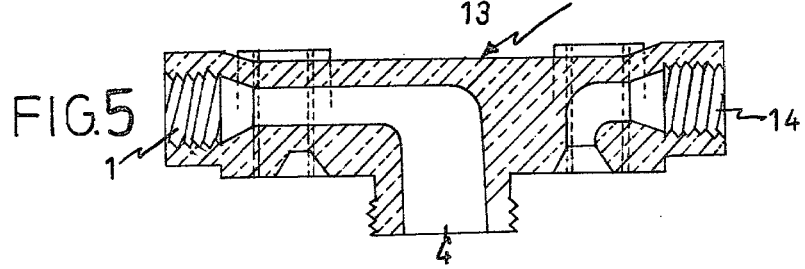
FIG. 5 is a sectional view B—B of FIG. 4.
Figure 4:
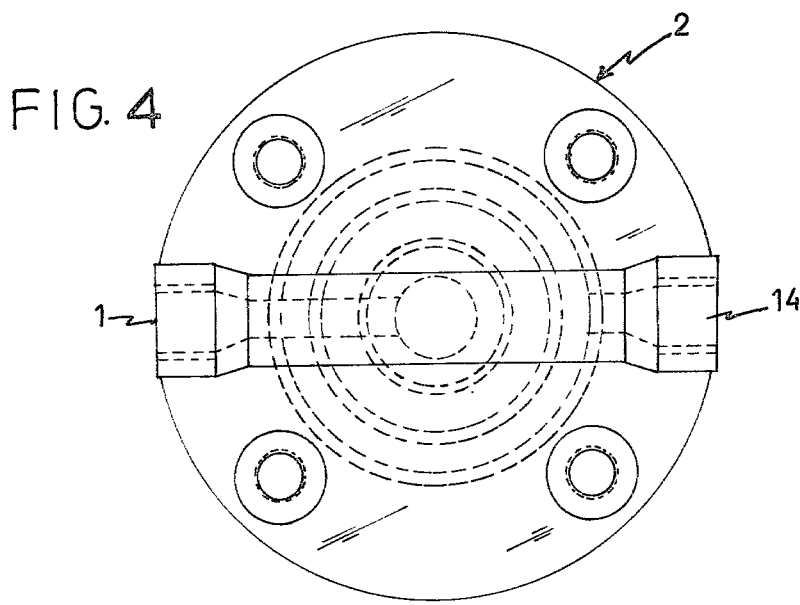
FIG. 4 is a top view of the second portion in which the water separator is coupled.
Figure 6:
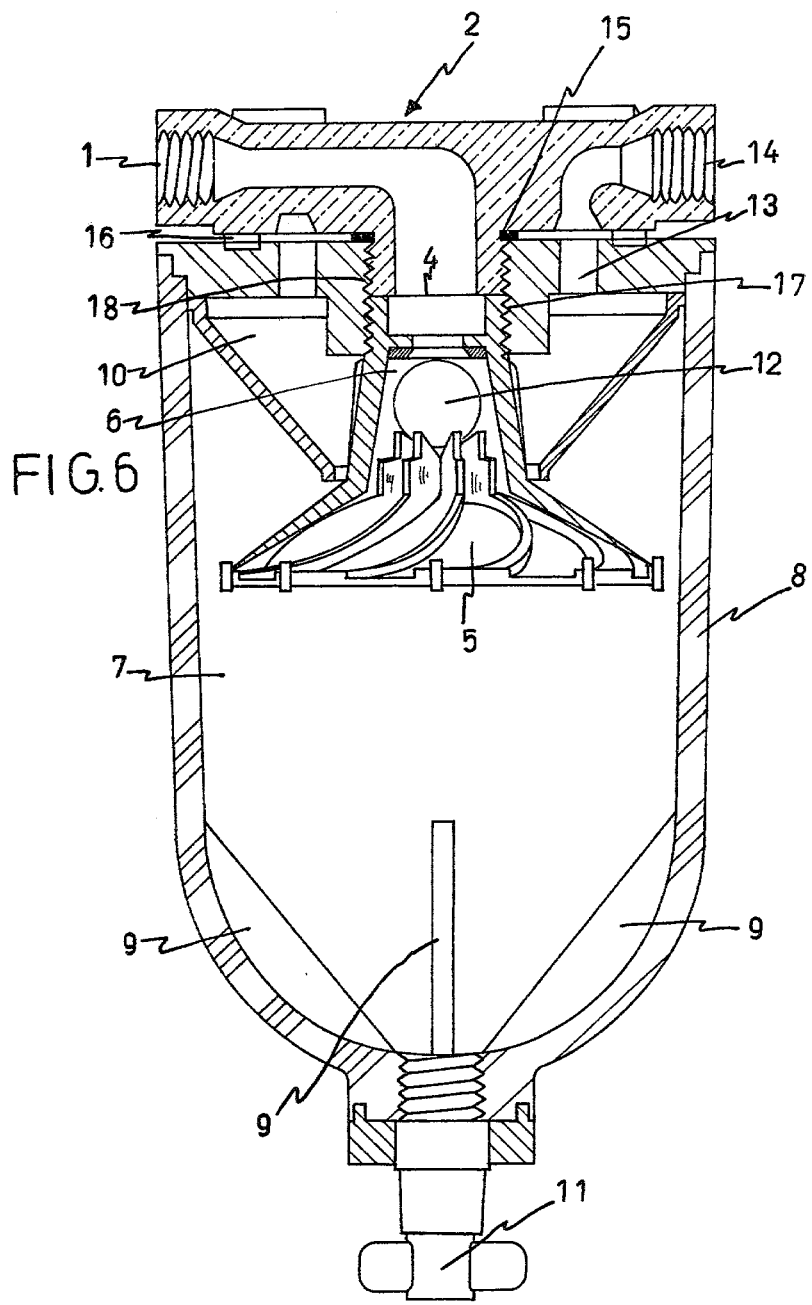
FIG. 6 is a sectional view of the separator of FIG. 1.
Figure 7:
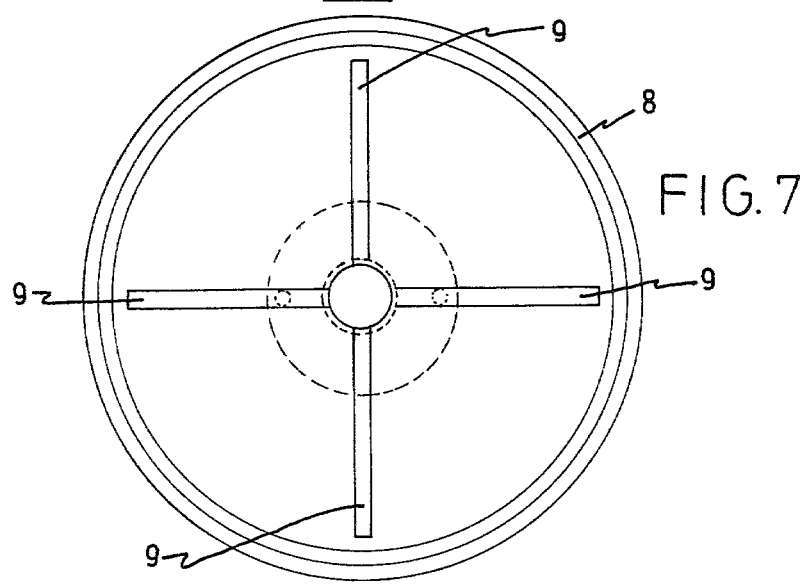
FIG. 7 is a top view of the plastic bowl showing the four ribs integrated at the bottom thereof.
Figure 8:
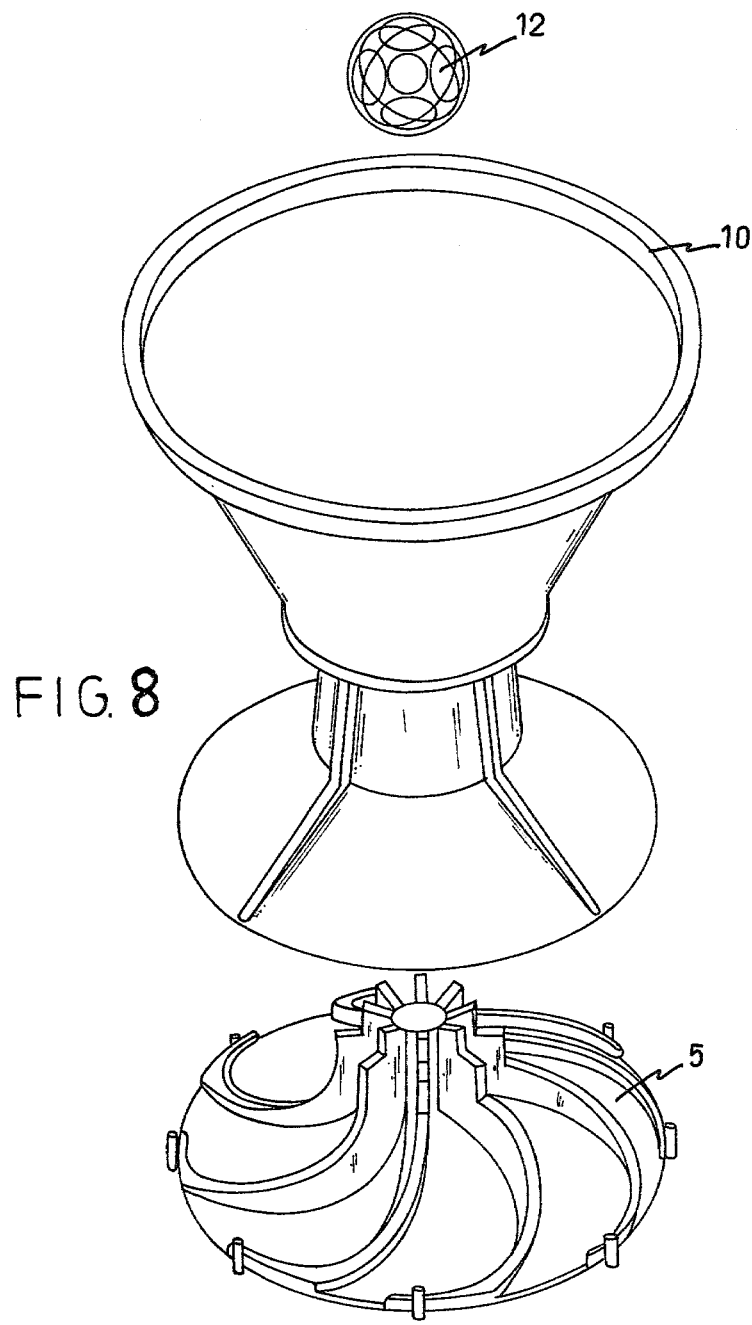
FIG. 8 is a perspective view of the inverted cone partially broken away to show various details thereof.

Through the inlet connection (1) located in the second section (2) the fluid enters the apparatus by means of a conduit (4) to the centrifugal assembly (5). In this section, the fuel flows through the check valve housing (6) and gains velocity and is spinned and thrown to the inner walls of the plastic bowl (8) and then to the expansion or depressurization zone (7) where the liquid and solid contaminants, heavier in density than the fuel, are separated and deposited at the bottom of the plastic bowl (8). In this plastic bowl there are four ribs (9) integrally formed at the bottom to help slowing the velocity of the spinning fuel, allowing the separated solid and water contaminants to fall faster to the bottom. On top of the centrifugal assembly and surrounding the same, there is an inverted cone (10) that traps minute particles of liquid contaminants, lighter than the fuel, which tend to adhere to the inner walls of said inverted cone and as they accumulate and become larger and are heavier they eventually fall to the bottom of the plastic bowl and then drained through the drain connection (11).

The hollow ball (12) located in the check valve housing floats when the fuel circulation stops and seals the fuel to be drawn back to the fuel tank. The fuel already clean of water and solid contaminants flows up through the elongated drillings of the cover of the concave plastic chamber (13) and from there to the original filtering equipment of the unit, through the outlet passage and connection (14).

The second section of the apparatus, has a built-in drilled threaded bushing that screws in the threaded hole of the first section, (17 and 18). Between the first and second section, two circumscript "O" rings are located (15 and 16) in corresponding grooves to seal both sections from air entering the system.

What I claim is:

1. A device for separating contaminants from a liquid with which such contaminants are not miscible and which is less dense than said contaminants, comprising an inlet and outlet portion formed with an inlet opening for allowing liquid to enter the device and an outlet opening for allowing liquid to leave the device, and a separator portion, said separator portion being releasably secured to said inlet and outlet portion and including a generally cylindrical receptable which, in use, is disposed with its central axis substantially vertical and with the inlet and outlet portion of the device at its upper end, and an impeller element at the upper end of the cylindrical receptacle and disposed to receive liquid entering the device by way of said inlet opening and to conduct such liquid into the receptacle while imparting a rotational component of movement thereto, whereby said contaminants are separated from the liquid by centrifugal effects and settle to the bottom of the receptacle while liquid having contaminants separated therefrom leaves the device by way of said outlet opening.

2. A device as claimed in claim 1, wherein the receptacle is provided, at its lower end, with a drain tap for drawing off contaminants accumulated in the bottom of the receptacle.

3. A device as claimed in claim 1, wherein the impeller element comprises a generally conical member, disposed with apex towards said inlet opening, provided on its upper surface with vanes defining spiral channels through which the liquid passes from the inlet opening into the receptacle.

4. A device as claimed in claim 1, wherein the separator portion includes a check valve for preventing liquid from passing from the receptacle into said inlet opening.

5. A device as claimed in claim 1, wherein the separator portion is attached to the inlet and outlet portion by means of interengaging screwthreads.

6. A device as claimed in claim 1, including sealing elements effective between the inlet and outlet portion and the separator portion to prevent escape of liquid.

7. A device as claimed in claim 1, wherein said receptacle is made of transparent material.

8. A device as claimed in claim 1, wherein the receptacle is formed at the lower end thereof with vanes against which the rotating flow of liquid impinges.

* * * * *